US010861053B1

United States Patent
Feininger et al.

(10) Patent No.: US 10,861,053 B1
(45) Date of Patent: Dec. 8, 2020

(54) SYSTEM AND METHODOLOGY FOR CREATING DEVICE, HOUSEHOLD AND LOCATION MAPPING FOR ADVANCED ADVERTISING

(71) Applicant: CSC Holdings, LLC, Bethpage, NY (US)

(72) Inventors: William Feininger, Palm Harbor, FL (US); Jason Attanasio, Forest Hills, NY (US)

(73) Assignee: CSC Holdings, LLC, Bethpage, NY (US)

( * ) Notice: Subject to any disclaimer, the term of this patent is extended or adjusted under 35 U.S.C. 154(b) by 101 days.

(21) Appl. No.: 16/180,524

(22) Filed: Nov. 5, 2018

(51) Int. Cl.
*G06Q 30/00* (2012.01)
*G06Q 30/02* (2012.01)
*H04W 4/029* (2018.01)

(52) U.S. Cl.
CPC ..... *G06Q 30/0269* (2013.01); *G06Q 30/0204* (2013.01); *G06Q 30/0261* (2013.01); *G06Q 30/0267* (2013.01); *G06Q 30/0277* (2013.01); *H04W 4/029* (2018.02)

(58) Field of Classification Search
None
See application file for complete search history.

(56) References Cited

U.S. PATENT DOCUMENTS

| | | | | |
|---|---|---|---|---|
| 8,327,403 B1* | 12/2012 | Chilvers | ..... | H04N 21/47214 725/58 |
| 10,175,933 B1* | 1/2019 | Wagner | ..... | H04N 21/4532 |
| 10,567,515 B1* | 2/2020 | Bao | ..... | H04L 67/22 |
| 2006/0155597 A1* | 7/2006 | Gleason | ..... | G06Q 30/0226 705/14.12 |
| 2009/0132364 A1* | 5/2009 | Agarwal | ..... | G06Q 30/0267 705/14.61 |
| 2009/0313232 A1* | 12/2009 | Tinsley | ..... | H04N 21/25883 |
| 2011/0145847 A1* | 6/2011 | Barve | ..... | H04H 60/64 725/9 |
| 2012/0023522 A1* | 1/2012 | Anderson | ..... | H04N 7/173 725/35 |
| 2012/0052871 A1* | 3/2012 | Cochran | ..... | G06Q 30/0261 455/456.1 |

(Continued)

OTHER PUBLICATIONS

STIC EIC 3600 Search Report for application 16180524 dated May 12, 2020 (Year: 2020).*

*Primary Examiner* — Matthew T Sittner
(74) *Attorney, Agent, or Firm* — Sterne, Kessler, Goldstein & Fox P.L.L.C.

(57) ABSTRACT

The present disclosure describes a targeted advertising system that harnesses an expansive device footprint to create targeted advertisements based on household demographics and characteristics about persons in the households. The targeted advertising system uses device identifiers and longitude/latitude data to map devices to households. After associating devices with a household, the targeted advertising system leverages a wide-array of data assets to create an enormous panel of households, devices, persons, locations, and demographic information for use creating high-precisions, targeted advertising campaigns. This greatly enhanced device footprint creates the opportunity for highly accurate ad targeting across a far greater amount of devices and a larger footprint at any time and place.

20 Claims, 5 Drawing Sheets (56) References Cited

U.S. PATENT DOCUMENTS

| | | | |
|---|---|---|---|
| 2013/0325603 A1* | 12/2013 | Shamir | G06Q 30/0255 705/14.52 |
| 2014/0007162 A1* | 1/2014 | Harrison | G08C 17/02 725/35 |
| 2014/0221095 A1* | 8/2014 | MacNaughton | A63F 13/216 463/35 |
| 2014/0237496 A1* | 8/2014 | Julian | H04N 21/812 725/13 |
| 2014/0344057 A1* | 11/2014 | Massoudi | G06Q 30/0257 705/14.58 |
| 2015/0149301 A1* | 5/2015 | Dow | G06Q 30/0273 705/14.69 |
| 2015/0170221 A1* | 6/2015 | Shah | G06Q 30/0275 705/14.71 |
| 2015/0296242 A1* | 10/2015 | Khalil | H04N 21/26283 725/25 |
| 2016/0027055 A1* | 1/2016 | Dixon | H04L 67/306 705/14.58 |
| 2017/0006342 A1* | 1/2017 | Nagaraja Rao | H04N 21/4661 |
| 2017/0064411 A1* | 3/2017 | Goli | H04N 21/812 |
| 2017/0070476 A1* | 3/2017 | Massoudi | G06Q 30/0261 |
| 2017/0243244 A1* | 8/2017 | Trabelsi | G06Q 30/0255 |
| 2017/0287010 A1* | 10/2017 | McKay | G06Q 30/0261 |
| 2018/0174217 A1* | 6/2018 | Iriyama | G06Q 10/1093 |
| 2018/0286000 A1* | 10/2018 | Berry, Jr. | G06Q 50/265 |
| 2018/0300389 A1* | 10/2018 | Tajima | G06Q 30/02 |
| 2019/0197567 A1* | 6/2019 | Krasinski | G06Q 30/0203 |

* cited by examiner

SYSTEM AND METHODOLOGY FOR CREATING DEVICE, HOUSEHOLD AND LOCATION MAPPING FOR ADVANCED ADVERTISING

BACKGROUND

Multi-screen advertising platforms enable advertisers to target advertisements to customers viewing television, video, digital, mobile and other content provided by content providers. Identifying a particular individual as the content consumer, potentially across multiple devices, is of paramount concern in tailoring an effective targeted, multi-screen, advertising campaign. When a targeted advertising system identifies the individual, advertisements can be directed towards known demographic qualities and other characteristics about that particular individual.

BRIEF DESCRIPTION OF THE DRAWINGS/FIGURES

The present disclosure is described with reference to the accompanying drawings. In the drawings, like reference numbers indicate identical or functionally similar elements. Additionally, the left most digit(s) of a reference number identifies the drawing in which the reference number first appears. In the accompanying drawings.

The present disclosure will now be described with reference to the accompanying drawings.

DETAILED DESCRIPTION OF THE DISCLOSURE

Overview

The present disclosure describes a targeted advertising system that combines device information and geo-behavioral data with a wide-array of data assets to create an enormous panel of households, devices, persons, locations, characteristics, and demographics for use when creating high-precision, targeted advertising campaigns. By mapping Internet Protocol (IP) addresses and mobile device identifiers to a household identifier, a targeted advertising system can richly expand the device footprint. Where current methods of producing a footprint rely on cookies or direct relationships with service providers and/or multichannel video programming distributors (MVPD), the present disclosure describes methods and systems obviating these dependencies through the creation of a household identifier linking households to demographics, statistics, and characteristics contained in data assets. By incorporating the demographic data assets via the household proxy, detailed targeted advertising campaigns can be created and narrowly tailored to serve advertisements only to appropriate IP addresses and mobile device identifiers. The enhanced device footprint creates the opportunity for highly accurate advertisement targeting across a far greater number of devices at any time and place.

Exemplary Targeted Advertising System

Figure 1:
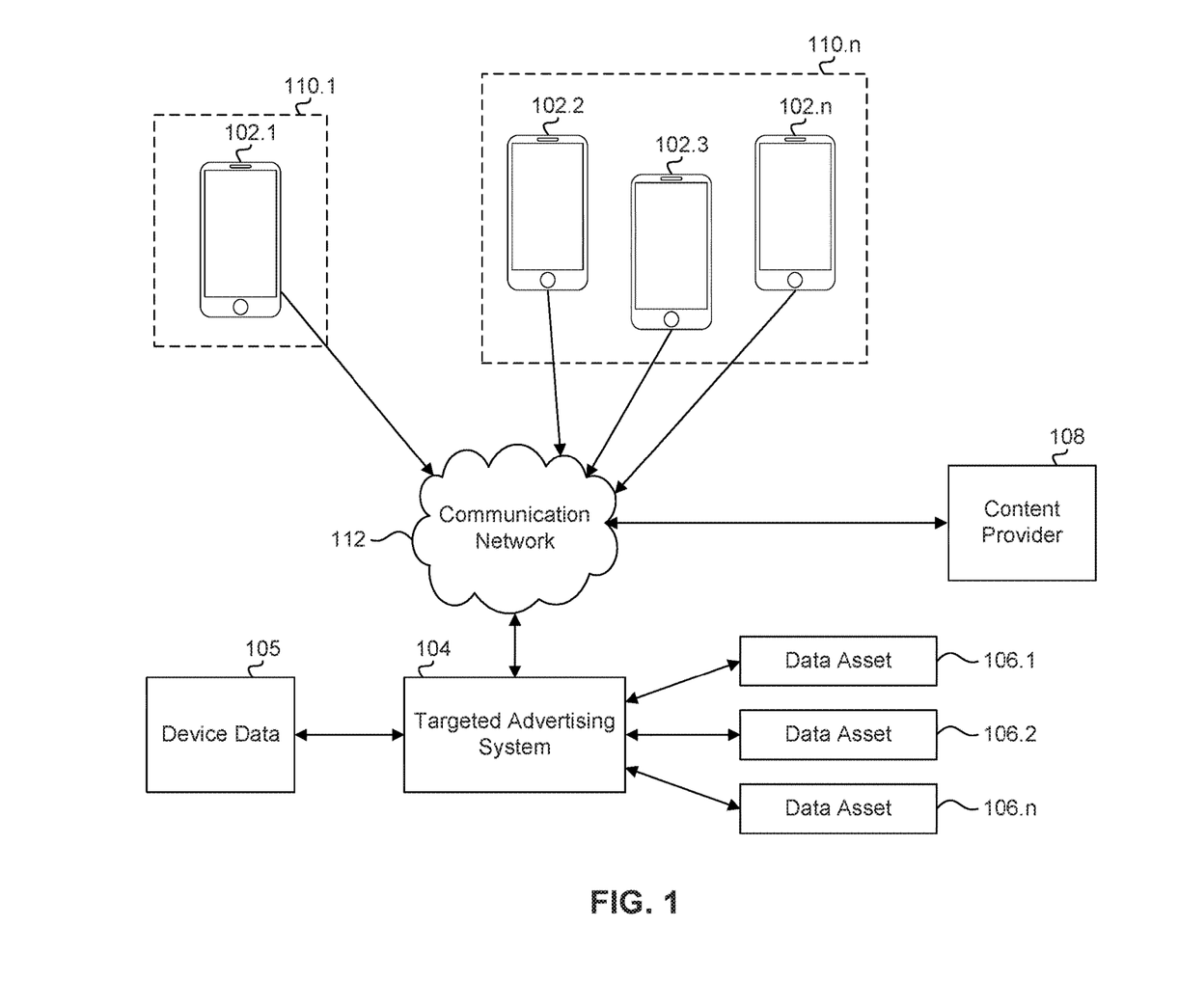
FIG. 1 illustrates a block diagram of an exemplary targeted advertising system, according to an embodiment of the present disclosure.

FIG. 1 illustrates a block diagram of an exemplary system 100 according to an embodiment of the present disclosure. System 100 includes devices 102.1 through 102.$n$, targeted advertising system 104, data assets 106.1 through 106.$n$, content provider 108, households 110.1 through 110.$n$, and communication network 112.

Devices 102.1 through 102.$n$ represent one or more personal computers, data terminal equipment, one or more telephony devices, such as one or more mobile phones or one or more mobile computing devices to provide some examples, one or more broadband media players, one or more network-controlled appliances, one or more set-top boxes, one or more internet ready televisions, one or more wireless routers, and/or other devices capable of transmitting and/or receiving content, e.g., video, audio, and/or other suitable data that will be apparent to those skilled in the relevant art(s) without departing from the spirit and scope of the present disclosure. Devices 102.1 through 102.$n$ include mobile device identifiers, i.e., unique identifiers pinpointing a particular device among devices 102.1 through 102.$n$. Such a mobile device identifier persists with a device throughout the device's lifespan and differs from all other unique identifiers among devices 102.1 through 102.$n$. Such a mobile device identifier can employ different protocols and/or naming conventions depending on the type of the device. Devices 102.1 through 102.$n$ can be owned, used by, or otherwise associated with a person, household, organization, or other suitable entity.

Targeted advertising system 104 directs advertisements towards selected, configured, constructed, arranged, built, or otherwise determined audience segments. An audience segment can be a subgroup of persons, organizations, or entities partitioned, divided, or dichotomized according to traits, i.e., distinguishing characteristics such as demographics, geography, behaviors, media consumption, product usage, etc. An advertiser can combine multiple criterion to fashion a single audience segment or create an audience segment based upon a single criterion. For example, a targeted advertisement can target an audience segment of males over 40 years of age that reside in Pittsburgh, Pa. and drive a particular make and model of car. One skilled in the relevant art(s) will appreciate that demographic information of this variety can be harvested and culled from multiple and varied sources, for example, those described below as data assets 106.1 through 106.$n$.

Targeted advertising system 104 also can incorporate particular geographic locations when specifying criteria for an advertising campaign or audience segment. In an embodiment, targeted advertising system 104 allow an advertiser to define a geographic area and serve an advertisement to customers only within the geographic area. Targeted advertising system 104 can receive the geographic-area definition in a variety of formats, e.g., coordinates or other latitude/longitude data, selecting or highlight on a map, by zip code, etc. For example, targeted advertising system 104 can serve an advertisement to customers only when a mobile device or other device associated with a customer is physically situated in a particular shopping mall.

Targeted advertising system 104 can further engage in geo-behavioral targeting, i.e., the use of historical longitude/latitude information as a driver of behavioral conclusions. In an embodiment, targeted advertising system 104 can determine the hours that a customer is typically in a location based on the historical records of timestamps and latitude/longitude pairs received in the device data. For example, targeted advertising system 104 can determine the hours that a customer works and can serve a customer an advertisement for office supplies during the hours that the customer historically works. Or in the above shopping mall example, targeted advertising system 104 can recognize that a customer is at a particular shopping mall on Sunday afternoons and can serve shopping-mall-relevant advertisements on a Sunday afternoon.

Targeted advertising system 104 harnesses, leverages, and incorporates device data to fashion an expansive device footprint. For example, targeted advertising system 104 can retrieve, incorporate, analyze, store, etc., data describing when particular devices were in a particular place, e.g., latitude/longitude, device identifiers, Internet Protocol (IP) addresses, timestamps, cookies, and a litany of other suitable device information. Device data 105 can include thousands, millions, or billions of records or more. Targeted advertising system 104 analyzes this data to associate devices with households and the persons in those households. Targeted advertising system 104 builds a household identifier and assigns or associates the household identifier to/with each mobile device identifier. The household identifier is described in further detail below with reference to households 110.1 through 110.*n*. A household can include one or more mobile device identifiers, a household can include one or more persons, and the one or more persons can be associated with one or more mobile device identifiers.

In an embodiment, targeted advertising system 104 serves a targeted advertisement to an appropriate IP address, as determined based on configured advertising campaigns and associated criteria. Targeted advertising system 104 resolves the IP address(es) after determining persons and households matching criteria specified for a targeted advertisement. To select the appropriate IP address(es), targeted advertising system 104 leverages a device footprint, i.e., a mapping of persons to devices to IP addresses. Because IP addresses are dynamic, the relationship between IP addresses and persons' devices change over time. Previous approaches to determining a device footprint relied on on-site hardware (i.e., builders of IP address to location) at MVPDs and ISPs to compile lists linking street addresses to IP addresses. However, to construct a more expansive footprint, targeted advertising system 104 builds, compiles, and maintains a data warehouse describing persons, households, IP addresses, and demographics based on the device data and associated data assets to determine persons in the market but outside traditional footprints. Targeted advertising system 104 further leverages geo-behavioral data to determine additional persons within a specific geography or target area and to target advertisements based on the locational information.

In an embodiment, targeted advertising system 104 secures a transmission of a targeted advertisement using any cryptographic protocol that enables secure communications. In one embodiment, targeted advertising system 104 uses secure sockets layer, transport layer security, or other suitable standard security protocol to encrypt transmissions. In an embodiment, targeted advertising system 104 receives transmissions from devices 102.1 through 102.*n* and/or content provider 108 using similarly security protocols.

Device data 105 can be basic information about devices 102.1 through 102.*n* used by targeted advertising system 104 to build an expansive device footprint. Device data 105 can include latitude/longitude pairs, device identifiers, IP addresses, timestamps, cookies, and varied additional device information. Device data 105 can include thousands, millions, or billions of records or more. In an embodiment, device data 105 is compiled by targeted advertising system 104. In an alternate embodiment, device data 105 can be retrieved via an appropriate application programming interface or data producing protocol.

Data assets 106.1 through 106.*n* are databases, data archives, data lakes, data warehouses, blobs, repositories, documents, files, client first party data and/or other structured and unstructured storage mechanisms. Data assets 106.1 through 106.*n* record, store, and describe demographic characteristics about households, persons, devices, and IP addresses. Examples of data assets 106.1 through 106.*n* include: voter registration records, department of motor vehicle records, sales and purchase records, social media records, and any other suitable evidence of characteristics that advertisers may be interested in targeting. Data assets 106.1 through 106.*n* can be linked by targeted advertising system 104 to a stored household identifier. In an embodiment, a surrogate identifier, primary key, or other household indicator in data assets 106.1 through 106.*n* matches the household identifier created and stored by targeted advertising system 104. This allows targeted advertising system 104 to link the stored households to the demographic information in data assets 106.1 through 106.*n*. In an alternate embodiment, the household identifiers in targeted advertising system 104 can be related to the surrogate identifiers in data assets 106.1 through 106.*n*. Thus, when targeted advertising system 104 creates a demographic- or geo-behavioral-contingent targeted advertising campaign, targeted advertising system 104 determines matching households and persons and retrieves a large set of IP addresses satisfying targeted advertisement criteria via the household proxy.

Content provider 108 provides video, audio, pictures, and other media assets to devices 102.1 through 102.*n*. In an embodiment, this content includes movies, television shows, news, and/or sports programming to provide some examples. Content provider 108 can interrupt a customer's viewing experience periodically to request a targeted advertisement from targeted advertising system 104 and provide that advertisement to devices 102.1 through 102.*n* for viewing by the customer. In an embodiment, content provider 108 can include multiple content providers working in tandem via a network or offering separate platforms for viewing media content. In one embodiment, content provider 108 passes an IP address to targeted advertising system 104 when requesting a targeted advertisement, and targeted advertising system 104 determines appropriate targeted advertisements based on the IP address.

Households 110.1 through 110.*n* represent an organizational structure including one or more persons and/or one or more devices among devices 102.1 through 102.*n*. Households 110.1 through 110.*n* can be a grouping mechanism, i.e., a logical construct, used by targeted advertising system 104 to organize devices 102.1 through 102.*n*. Households 110.1 through 110.*n* can be associated with a postal address, latitude/longitude pair, zip code, geo-fence, or other suitable indicator of location. Households 110.1 through 110.*n* can be associated with demographic information for persons associated with the household. For example, a household among households 110.1 through 110.*n* can include three individuals each with their own characteristics, as stored in and retrieve from data assets 106.1 through 106.*n*. Households 110.1 through 110.*n* can include multiple persons within the household, but households 110.1 through 110.*n* can also include one household as well as one or more device such as devices 102.1 through 102.*n*. Households 110.1 through 110.*n* can be assigned or attributed a unique household identifier by targeted advertising system 104. The unique household identifier can be an alphanumeric string capable of uniquely distinguishing households from one another. In one example, the household identifier can be the full, physical address of the household with the spaces removed. However, any suitable system of determining the household identifier can be employed by targeted advertising system 104.

Communication network 112 communicatively couples targeted advertising system 104, customer devices 102.1 through 102.*n*, and content provider 108. Communication network 110 can be implemented as a wireless communication network, a wired communication network, and/or any combination thereof as will be apparent to those skilled in the relevant art(s) without departing from the spirit and scope of the present disclosure. For example, communication network 110 can include one or more radio networks, such as terrestrial radio frequency networks or satellite radio frequency networks, one or more coaxial cable networks, one or more fiber optic cable networks, and/or another suitable communication network.

Exemplary Data Warehouse in the Targeted Advertising System

Figure 2:
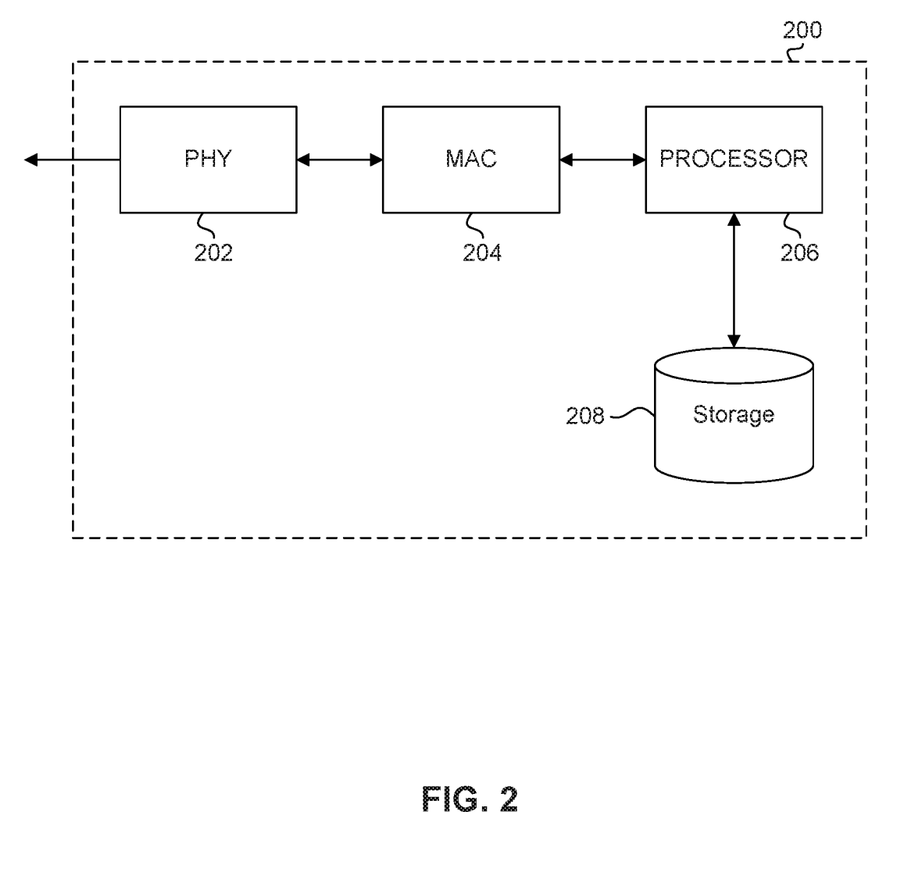
FIG. 2 illustrates a block diagram of an exemplary data warehouse in a targeted advertising system, according to an embodiment of the present disclosure.

FIG. 2 illustrates a block diagram of an exemplary data warehouse 200 in exemplary targeted advertising system 104 according to an embodiment of the present disclosure. Data warehouse 200 can store device information, household identifiers, and other information used to link households to IP addresses and to map persons in the households to demographic information and other characteristics. As illustrated in FIG. 2, subscriber device 200 includes PHY circuitry 202, media access controller (MAC) circuitry 204, processor circuitry 206, and storage medium 208. Subscriber device 200 can represent an exemplary embodiment of subscriber devices 102.1 through 102.*n*.

PHY circuitry 202 represents an interface between a communication network, such as communication network 112 to provide an example, and MAC circuitry 204. Generally, PHY circuitry 202 can modulate, encode, and/or convert an information frame to provide an information signal for transmission to the communication network. PHY circuitry 202 can also demodulate, decode, and/or convert an information signal received over a communication network to provide an information frame.

MAC circuitry 204 represents an interface between PHY circuitry 202 and processor circuitry 206. MAC circuitry 204 can manage and maintain communication by coordinating access to the communication network and formatting communication in accordance with one or more communication standards or protocols. MAC circuitry 204 can also de-encapsulate or de-frame in accordance with the one or more communication standards or protocols.

Processor circuitry 206 controls the overall operation and/or configuration of data warehouse 200. For example, processor circuitry 206 can interact receive, transform, and interact with data assets, for example data assets 106.1 through 106.*n*. Processor circuitry 206 can retrieve device information including device identifiers and location information from local storage or via interactions with external application programming interfaces, for example from device data 105. Processor circuitry 206 can further assign, create, store, and retrieve appropriate household identifiers and update stored information associated with the households, for example, information about persons in the households, address information, IP addresses, etc., as described in further detail above with reference to FIG. 1.

Storage medium 208 stores configuration information about data warehouse 200 and other related information. Storage medium 208 can store configuration information as text files within a volatile memory, such as random access memory (RAM), and/or non-volatile memory, such as read-only memory (ROM). The RAM can be implemented in dynamic random-access memory (DRAM), a static random-access memory (SRAM), and/or a non-volatile random-access memory (NVRAM) configuration to provide some examples. Storage medium 208 can be organized into a database and can leverage any commercially available database management system such as Microsoft Access, Microsoft SQL server, an Oracle database, an IBM database, an SAP database, a Hadoop cluster etc. Storage may also be implemented via cloud based systems such as Microsoft Azure, Amazon AWS, etc. Storage medium 208 can be any other suitable storage mechanism.

Exemplary Method to Enhance Device Footprint

Figure 3:
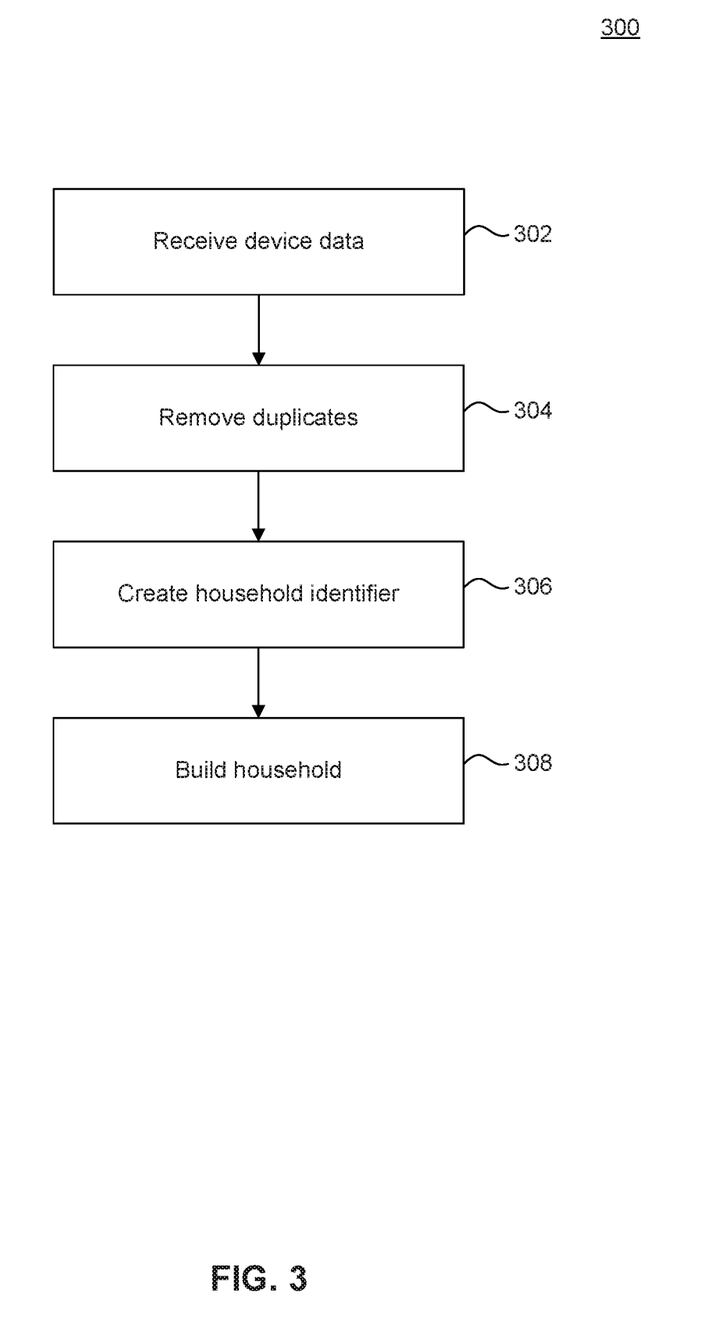
FIG. 3 is a flowchart of exemplary operational steps to map device data to data assets via a household proxy, according to an embodiment of the present disclosure.

FIG. 3 is a flowchart of exemplary operational steps to map device information to data assets via a household proxy, according to an embodiment of the present disclosure. The disclosure is not limited to this operational description. Rather, it will be apparent to ordinary persons skilled in the relevant art(s) that other operational control flows are within the scope and spirit of the present disclosure. The following discussion describes an exemplary operational control flow 300 for mapping device information, described above as device data 105, to data assets, described above as data assets 106.1 through 106.*n* to create an enhanced device footprint that links persons to demographic information and other characteristics.

At operation 302, operational control flow 300 receives device data about a multitude of consumer devices, such as devices 102.1 through 102.*n*. Such data includes mobile device IDs, IP addresses, latitude/longitude pairs or other location coordinates, cookies, timestamp information, and a variety of other suitable information about devices 102.1 through 102.*n*. Operational control flow 300 can import or retrieve the data using a suitable data retrieval protocol or by interfacing with an appropriate application programming interface. In an embodiment, operational control flow 302 receives this data from an external people-based identity management company. In an alternate embodiment, operational control flow 300 retrieves this information from an internal source, e.g., data warehouse 200. Operational control flow 300 can receive hundreds, thousands, millions, billions, or more of instances of device data and can organize or arrange the data in a suitable fashion, for example, in a hashing data structure, structured or unstructured database, spreadsheet, or other format capable of being retrieved, manipulated, and analyzed.

At operation 304, operational control flow 300 removes and/or updates duplicate device identifiers and IP addresses from the device data received in operation 302. In an embodiment, operational control flow 300 refreshes the data periodically with up-to-date, device data. As subsequent retrievals can include redundant or duplicative entries, operational control flow 300 can remove device identifiers and IP addresses that targeted advertising system 104 previously stored in data warehouse 206, i.e., device identifiers that are already associated with a household and/or demographic information. Operational control flow 300 can also remove or update any redundant or duplicative additional device information received in 302 to provide a more robust, meaningful, and workable set of device data. In another embodiment, operational control flow 300 deletes legacy information entirely and refreshes the device data with a fresh copy of data; in this embodiment, no duplicate removal step is needed but the device data is refreshed in its entirety.

At operation 306, operational control flow 300 creates a surrogate identifier, i.e., a household identifier for the IP address. A surrogate identifier may be a primary key or other form of unique identification used to identify a household as compared to other households in households 110.1 through 110.n. In one embodiment, operational control flow 300 identifies a physical address based on the latitude/longitude pairs or other location coordinates received in operation 302. In other embodiments, operational control flow 300 identifies the household through other forms of location information or via metadata. In one embodiment, operational control flow 300 creates a surrogate identifier by creating a hash key based on the physical address, for example, by removing all spaces from the physical address resulting in a unique identifier. However, this is merely an example, and operational control flow 300 can use any suitable method to create an anonymous surrogate identifier. The surrogate identifier is unique to the household and identifies the household with particularity among other households, such as households 110.1 through 110.n.

At operation 308, operational control flow 300 builds a household profile and adds the household profile to the device panel. Operational control flow 300 can incorporate any appropriate data assets 106.1 through 106.n to flesh out an appropriate household profile. For example, operational control flow 300 can retrieve information from a voting registration data asset about the political affiliation of the members of the household. In this example, the household profile can then be used to target advertisements only to members of a particular political party. Operational control flow 300 can insert or update a record in data warehouse 200 including information about the household along with the surrogate identifier. In an embodiment, operational control flow 300 can the stored information to determine appropriate targeted advertisements to display to customers, as described in further detail below with reference to FIG. 4.

Exemplary Method to Create Targeted Advertisement Harnessin Household Footprint

Figure 4:
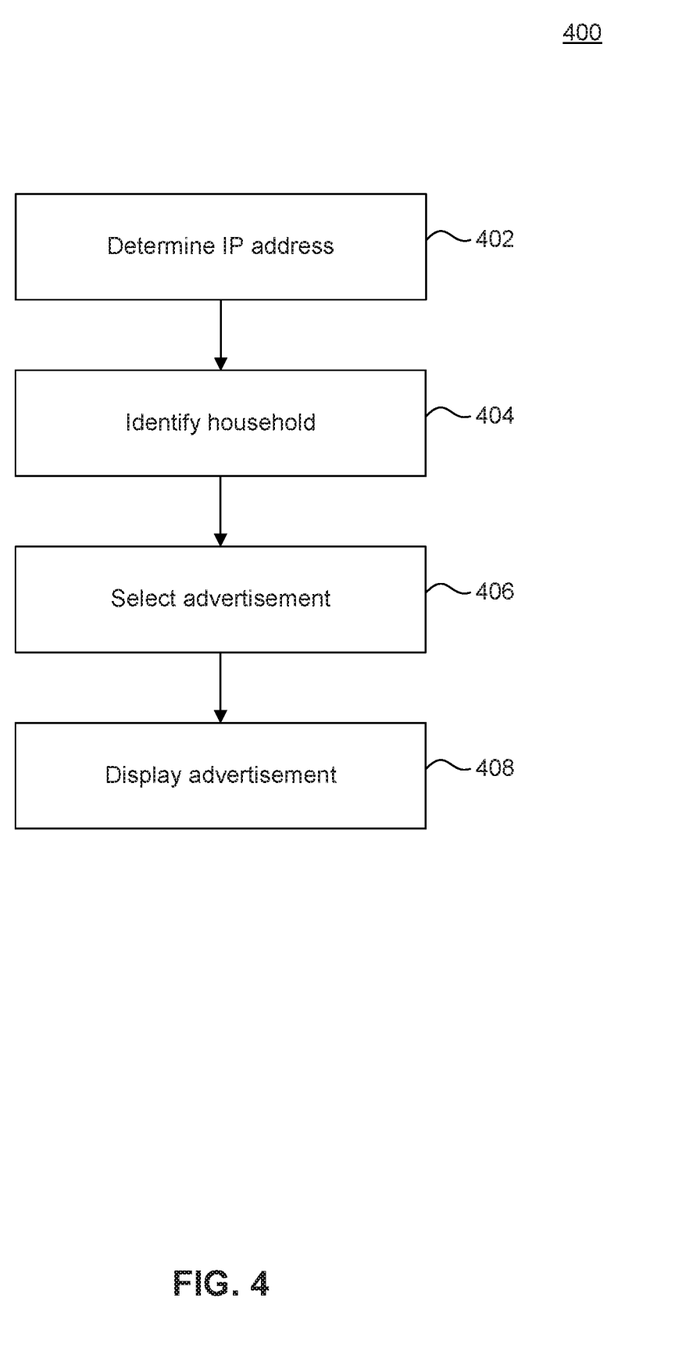
FIG. 4 is a flowchart of exemplary operational steps to relay a targeted advertisement to a customer identified using a device footprint, according to an embodiment of the present disclosure.

FIG. 4 is a flowchart of exemplary operational steps to relay a targeted advertisement to a customer identified using an enhanced device footprint, according to an embodiment of the present disclosure. The disclosure is not limited to this operational description. Rather, it will be apparent to ordinary persons skilled in the relevant art(s) that other operational control flows are within the scope and spirit of the present disclosure. The following discussion describes an exemplary operational control flow 400 for relaying a targeted advertisement based on an enhanced device footprint, such as the enhanced device footprint described above with reference to FIG. 3.

At operation 402, operational control flow 400 determines an IP address of a customer, for example, a viewer of content provider 108. Although this disclosure refers to IP addresses, the identifier can be any label or other signifier of identity that is assigned to a device connected to a computer network. In one embodiment, content provider 108 sends the IP address of the viewer to targeted advertising system 104 and requests an appropriate advertisement. In another embodiment, targeted advertising system 104 receives a transmission from devices 102.1 through 102.n, and the transmission includes the IP address in a header or other suitable location.

At operation 404, operational control flow 400 identifies a household stored in the panel of household information matching the IP address received in 402. Operational control flow 400 can, for example, retrieve matching households in data warehouse 200 by forming an appropriate SQL predicate using the IP address to pull household information from a database using an appropriate SQL query. Household information includes demographic information harvested from data assets 106.1 through 106.n, thus operational control flow 400 also accesses a vast amount of characteristics about persons in the retrieved household by joining appropriate data assets in 106.1 through 106.n using the retrieved household identifier. In an embodiment, operational control flow 400 may relate the household identifier stored in targeted advertising system 104 to the surrogate identifiers in data assets 106.1 through 106.n.

At operation 406, operational control flow 400 selects an appropriate advertisement from advertisements stored in targeted advertising system 104 to serve to the customer at the IP address determined in 402. Operational control flow 400 retrieves one or more advertisements and associated targeting criteria from information stored in targeted advertising system 104. In an embodiment, operational control flow 400 can retrieve the advertisement criteria that match the characteristics stored in the household panel for the IP address received and/or determined in 402, for example, if the household includes a male, democrat, aged 42, operational control flow 400 can retrieve one or more advertisements targeted towards males, democrats, and people aged 40-45. Once the suitable matches are retrieved for the targeting criteria, operational control flow 400 selects an appropriate advertisement to display, play, or otherwise relay. In some instances, more than one stored advertisement will match the household/person characteristics. In such an occurrence, a suitable tie-breaking mechanism may be employed by operational control flow 400 to determine the advertisement to display. For example, an automated auction system may be employed to serve the advertisement to the customer based on a bidding system among advertisers. However, any suitable mechanism, e.g., randomness, may be used to determine a particular advertisement to select when the household satisfies the criteria for multiple advertisements.

At operation 408, operational control flow 400 displays, plays, showcases, or otherwise relays the advertisement selected in operation 406 to the device devices 102.1 through 102.n matching the IP address for viewing by the customer. For example, operational control flow 400 can display a video of the advertisement, play an audio file containing the advertisement, display a picture of the advertisement, etc. The nature of the relayed advertisement may vary based on the nature of content provider 108.

Exemplary Computer System

Figure 5:
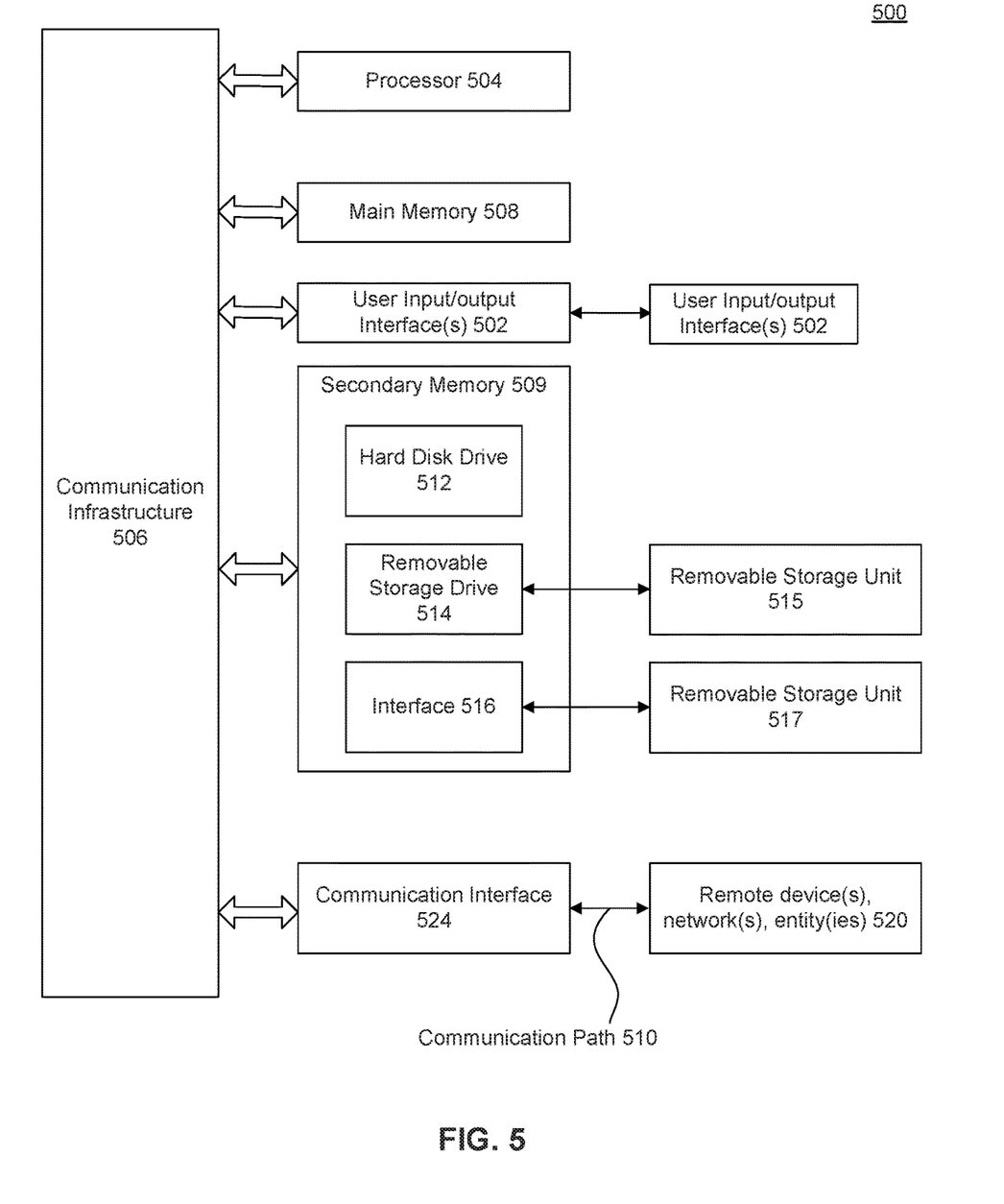
FIG. 5 is an example computer system useful for implementing various embodiments.

FIG. 5 is an example computer system useful for implementing various embodiments. Various embodiments may be implemented, for example, using one or more well-known computer systems, such as computer system 500 shown in FIG. 5. One or more computer systems 500 may be used, for example, to implement any of the embodiments discussed herein, as well as combinations and sub-combinations thereof.

Computer system 500 may include one or more processors (also called central processing units, or CPUs), such as a processor 504. Processor 504 may be connected to a communication infrastructure or bus 506.

Computer system 500 may also include user input/output device(s) 502, such as monitors, keyboards, pointing devices, etc., which may communicate with communication infrastructure or bus 506 through user input/output device(s) 502.

One or more of processors 504 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 500 may also include a main or primary memory 508, such as random access memory (RAM). Main memory 508 may include one or more levels of cache. Main memory 508 may have stored therein control logic (i.e., computer software) and/or data.

Computer system 500 may also include one or more secondary storage devices or memory 510. Secondary memory 510 may include, for example, a hard disk drive 512 and/or a removable storage device or drive 514. Removable storage drive 514 may be a floppy disk drive, a magnetic tape drive, a compact disk drive, an optical storage device, tape backup device, and/or any other storage device/drive.

Removable storage drive 514 may interact with a removable storage unit 418. Removable storage unit 518 may include a computer usable or readable storage device having stored thereon computer software (control logic) and/or data. Removable storage unit 518 may be a floppy disk, magnetic tape, compact disk, DVD, optical storage disk, and/any other computer data storage device. Removable storage drive 514 may read from and/or write to removable storage unit 518.

Secondary memory 510 may include other means, devices, components, instrumentalities or other approaches for allowing computer programs and/or other instructions and/or data to be accessed by computer system 500. Such means, devices, components, instrumentalities or other approaches may include, for example, a removable storage unit 522 and an interface 520. Examples of the removable storage unit 522 and the interface 520 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 500 may further include a communication or network interface 524. Communication interface 524 may enable computer system 500 to communicate and interact with any combination of external devices, external networks, external entities, etc. (individually and collectively referenced by reference number 528). For example, communication interface 524 may allow computer system 500 to communicate with external or remote devices 528 over communications path 526, which may be wired and/or wireless (or a combination thereof), and which may include any combination of LANs, WANs, the Internet, etc. Control logic and/or data may be transmitted to and from computer system 500 via communication path 526.

Computer system 500 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 500 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 500 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 500, main memory 508, secondary memory 510, and removable storage units 518 and 522, as well as tangible articles of manufacture embodying any combination of the foregoing. Such control logic, when executed by one or more data processing devices (such as computer system 500), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 4. In particular, embodiments can operate with software, hardware, and/or operating system implementations other than those described herein.

CONCLUSION

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A method, comprising:
receiving, by a targeted advertising system, a device dataset comprising an internet protocol address, location information, and/or a mobile device identifier, an advertisement, one or more criterion and an advertisement request from a content provider comprising a requesting internet protocol address;
creating, by the targeted advertising system, a household identifier that represents a household and an audience segment comprising the one or more criterion linked to the advertisement;
associating, by the targeted advertising system, the internet protocol address, the location information, and the mobile device identifier with the household identifier and the audience segment with one or more households in a device panel by comparing the one or more criterion in the audience segment to characteristics in the device panel;
retrieving, by the targeted advertising system, a data asset comprising the characteristics associated with a person in the household using the household identifier;
storing, by the targeted advertising system, the data asset, the person, the characteristics, the internet protocol address, the mobile device identifier, and the household identifier in the device panel;
determining, by the targeted advertising system, a matched audience segment by matching the requesting internet protocol address to the internet protocol address associated with the household in the device panel;
selecting, by the targeted advertising system, a relevant advertisement based on the matched audience segment and relaying, by the targeted advertising system, the relevant advertisement to the requesting internet protocol address.

2. The method of claim 1, wherein the one or more criterion further comprises a geographic area applicable to the advertisement and the advertisement is selected only when the coordinates fall within the geographic area.

3. The method of claim 1, wherein the advertisement comprises a video or audio file.

4. The method of claim 1, wherein the household identifier comprises a physical address of the household with spaces removed.

5. The method of claim 1, the retrieving the data asset further comprising:
receiving, by the targeted advertising system, the data asset from an advertiser or third-party data provider.

6. The method of claim 1, further comprising:
storing, by the targeted advertising system, a second person and second characteristics in association with the household in the device panel.

7. The method of claim 1, wherein the requesting internet protocol address is received from a set-top box.

8. A system, comprising:
a memory that stores a plurality of data assets, the plurality of data assets comprising a plurality of characteristics from a plurality of sources associated with a plurality of persons in a plurality of households; and
at least one processor coupled to the memory and configured to:
receive a device dataset comprising an internet protocol address, location information, and/or a mobile device identifier, an advertisement, one or more criterion and an advertisement request from a content provider comprising a requesting internet protocol address;
create a household identifier representing a household from among the plurality of households and an audience segment comprising the one or more criterion linked to the advertisement;
associate the internet protocol address, the location information, and/or the mobile device identifier with the household identifier and the audience segment with one or more households in a device panel by comparing the one or more criterion in the audience segment to characteristics in the device panel;
retrieve a data asset from among the plurality of data assets associated with the household identifier;
store the data asset, the person, the characteristics, the internet protocol address, the mobile device identifier, and the household identifier in the device panel;
determine a matched audience segment by matching the requesting internet protocol address to the internet protocol address associated with the household in the device panel;
select a relevant advertisement based on the matched audience segment; and
relay the relevant advertisement to the requesting internet protocol address.

9. The system of claim 8, wherein the one or more criterion further comprises a geographic area applicable to the advertisement and the advertisement is selected only when the coordinates fall within the geographic area.

10. The system of claim 8, wherein the advertisement comprises a video or audio file.

11. The system of claim 8, wherein the household identifier comprises a physical address of the household with spaces removed.

12. The system of claim 8, wherein to retrieve the data asset the at least one processor is further configured to:
   receive the data asset from an advertiser or third-party data provider.

13. The system of claim 8, the at least one processor further configured to:
   store a second person and second characteristics in association with the household in the device panel.

14. The system of claim 8, wherein the requesting internet protocol address is received from a set-top box.

15. A non-transitory computer-readable device having instructions stored thereon that, when executed by at least one computing device, causes the at least one computing device to perform operations comprising:
   receiving a device dataset comprising an internet protocol address, coordinates, and/or a mobile device identifier, an advertisement, one or more criterion and an advertisement request from a content provider comprising a requesting internet protocol address;
   creating a household identifier representing a household and an audience segment comprising the one or more criterion linked to the advertisement;
   associating the internet protocol address, the location information, and the mobile device identifier with the household identifier and the audience segment with one or more households in a device panel by comparing the one or more criterion in the audience segment to characteristics in the device panel;
   retrieving a data asset comprising the characteristics associated with a person in the household using the household identifier;
   storing the data asset, the person, the characteristics, the internet protocol address, the mobile device identifier, and the household identifier in the device panel;
   determining a matched audience segment by matching the requesting internet protocol address to the internet protocol address associated with the household in the device panel;
   selecting a relevant advertisement based on the matched audience segment and relaying the relevant advertisement to the requesting internet protocol address.

16. The non-transitory computer-readable device of claim 15, wherein the set of criteria further comprises a geographic area applicable to the advertisement and the advertisement is selected only when the location information fall within the geographic area.

17. The non-transitory computer-readable device of claim 15, wherein the advertisement comprises a video or audio file.

18. The non-transitory computer-readable device of claim 15, the retrieving comprising:
   receiving the data asset from an advertiser or third-party data provider.

19. The non-transitory computer-readable device of claim 15, the operations further comprising:
   storing a second person and second characteristics in association with the household in the device panel.

20. The non-transitory computer-readable device of claim 15, wherein the requesting internet protocol address is received from a set-top box.

\* \* \* \* \*